United States Patent [19]

Nishizawa et al.

[11] Patent Number: 4,593,320
[45] Date of Patent: Jun. 3, 1986

[54] TWO-DIMENSIONAL SOLID-STATE IMAGE PICKUP DEVICE

[75] Inventors: Jun-ichi Nishizawa; Takashige Tamamushi, both of Sendai, Japan

[73] Assignee: Jun-Ichi Nishizawa, Sendai, Japan

[21] Appl. No.: 714,677

[22] Filed: Mar. 21, 1985

[30] Foreign Application Priority Data

Mar. 23, 1984 [JP] Japan .................................. 59-56489

[51] Int. Cl.$^4$ .............................................. H04N 3/12
[52] U.S. Cl. .................................... 358/213; 357/24
[58] Field of Search .................... 358/212, 213, 209; 357/24 LR, 22, 30, 43

[56] References Cited

U.S. PATENT DOCUMENTS 4,233,632  11/1980  Akiyama ............................ 358/212
4,518,863   5/1985  Fukuoka et al. ..................... 250/578

OTHER PUBLICATIONS

Semiconductor Technologies, vol. 8, 1983, Japan Annual Reviews in Electronics, Computers & Telecommunications, "Set Image Converter" by Jun-ichi Nishizawa et al.

Primary Examiner—Gene Z. Rubinson
Assistant Examiner—Robert G. Lev
Attorney, Agent, or Firm—Cushman, Darby & Cushman

[57] ABSTRACT

A two-dimensional solid-state image pickup device wherein, in order to make it possible to have a high light detecting sensitivity even to feeble lights and to stably and uniformly detect picture images, picture elements each formed of a static induction transistor having an optical gain of $10^6$ to $10^8$ and able to detect even such feeble lights as of about $10^{-4}$ $\mu W/cm^2$ and a gate capacitor are arranged in a matrix to be a gate accumulating system capable of two-dimensional reading out, the source regions of the respective static induction transistors are connected to common source lines, the respective source lines are connected to the ground through parallelly connected source line selecting transistors and capacitors and the gates of the respective source line selecting transistors are connected respectively to vertical address lines so that, simultaneously with the selection of the vertical address lines, the source lines may be connected to the ground.

6 Claims, 15 Drawing Figures

TWO-DIMENSIONAL SOLID-STATE IMAGE PICKUP DEVICE

BACKGROUND OF THE INVENTION

1. Field of the Invention

This invention relates to a two-dimensional solid-state image pickup device of a gate accumulation system using static induction transistors.

2. Description of the Prior Art

Regarding the formation and signal detecting method of a conventional solid-state image pickup device by a gate accumulation system using static induction transistors (which shall be called SIT's hereinafter), various systems have been already suggested by the present inventors and are disclosed in Japanese patent applications Nos. 204656/1981, 217758/1982, 21688/1983 and 26932/1983. Further, the experiment results are published in "SIT Image Converter" by J. Nishizawa, T. Tamamushi and S. Suzuki in JARECT (Japan Annual Review in Electronics, Computers and Telecommunications) in Semiconductor Technologies Vol. 8 (October 1983) edited by J. Nishizawa (OHM & North Holland).

Further, a reading system utilizing a capacitor of a signal reading line in an X-Y address system as different from the formation and signal reading method of the conventional SIT image sensor have been already suggested by the present inventors and are discosed in Japanese patent application No. 208116/1983. Its formation and signal reading system shall be explained in the following with reference to FIGS. 1A to 2B.

In FIG. 1A, one picture elements $C_{ij}$ is formed of a normally off SIT and gate capacitor $C_G$, an address gate line $GL_j$ is connected to a gate 31 of the SIT through the gate capacitor $C_G$ and a signal reading line $SL_i$ is connected to a drain 30. Further, two switching transistors $Q_P$ and $Q_S$ are connected to the signal reading line $SL_i$, a video bias voltage $V_{DD}$ is impressed onto a drain terminal (output terminal) 10 of the switching transistor $Q_S$ through a load resistance $R_L$ and a constant bias voltage $V_{DD}'$ is impressed also onto a drain terminal 20 of the switching transistor $Q_P$. Here, the parasitic capacitance of the signal reading line $SL_i$ is indicated by $C_{SL}$. The information of the picture element $C_{ij}$ by a light input $h\nu$ is accumulated in the gate of the SIT. Then, the reading operation shall be explained. As shown in FIG. 1B, in the case of reading out the light information of the picture element $C_{ij}$, first the switching transistor $Q_P$ is made conductive by precharging pulses $\phi_P$ to charge the line $SL_i$ with a predetermined voltage $V_{DD}' - V_{thp}$ where $V_{thp}$ represents a threshold voltage of the switching transistor $Q_P$. Then, when address gate pulses $\phi_{Gj}$ are impressed onto the address gate line $GL_j$ and gate pulses are impressed on the gate part 31 of the SIT through the gate capacitor $C_G$ of the picture element $C_{ij}$ to make the SIT conductive, the impedance between the drain 30 and source 32 of the SIT will lower and therefore the voltage $V_{DD}' - V_{thp}$ with which the capacitor $C_{SL}$ has been charged will be discharged. At this time, the gate potential by a carrier as the light information accumulated in the gate 31 of the SIT will be raised by the address gate pulses $\phi_{Gj}$ added from outside and therefore the stronger the light intensity, the larger the discharge current following between the drain 30 and source 32 of the SIT.

If $I_L$ represents an incident light current and $I_S$ represents a reverse direction saturated current of a pin diode around the gate 31 of the SIT, a potential rise $\Delta V_G$ of the gate 31 of the SIT by a carrier generated by the light input $h\nu$ will be given substantially by the following formula where k represents Boltzmann's constant, T represents an absolute temperature and q represents a unit charge amount:

$$\Delta V_G = \frac{kT}{q} \ln\left(1 + \frac{I_L}{I_S}\right) \tag{1}$$

On the other hand, the relation between the gate voltage $V_G$ and drain current $I_D$ of the normally off SIT is an exponential function and is represented by $$I_D \propto \exp\frac{q\eta}{kT} V_G \tag{2}$$

where $\eta$ represents the rate of the gate voltage of SIT covering the intrinsic gate point.

On the other hand, in case the light intensity is weak, the light current $I_L$ by the light input $h\mu$ will be proportional to the incident intensity P ($\mu$W/cm$^2$). Therefore, in the above mentioned reading operation, the discharge current $I_{DC}$ flowing between the drain 30 and source 32 of the SIT is represented by $$I_{DC} \propto \exp\frac{q\eta}{kT} \Delta V_G = \tag{3}$$

$$\exp\frac{q\eta}{kT}\left(\frac{kT}{q} \ln\left(1 + \frac{I_L}{I_S}\right)\right), I_{DC} \propto \left(1 + \frac{I_L}{I_S}\right)\eta.$$

In the case of the normally off SIT, $\eta$ may be $\eta \approx 1$. Therefore, the discharge current $I_{DC}$ of the capacitor $C_{SL}$ charged with $V_{DD}' - V_{thp}$ is found to be proportional to the light current $I_L$ or incident light intensity P ($\mu$W/cm$^2$).

In FIG. 1B, $V_{SLi}$ represents a voltage waveform at each end of the capacitor $C_{SL}$ or a voltage variation of the signal reading line $SL_i$ and varies as in the dotted line a, one-point chain line b or solid line c with the impression of the address gate pulse $\phi_{Gj}$ to be on a voltage level lower than the voltage represented by $V_{DD}' - V_{thp}$. The dotted line a corresponds to the case of a dark current state, the one-point chain line b corresponds to the case of an ordinary light intensity and the solid line c corresponds to the case of a saturated exposure state. This time constant of the discharge is determined substantially by the product of the on-resistance value $R_{on(SIT)}$ between the drain and source of the SIT and the capacitance of the capacitor $C_{SL}$ in the circuit in FIG. 1A. It is a desirable condition that, when a dark current is flowing, even if the address gate pulses $\phi_{Gj}$ are impressed as shown by the dotted line in FIG. 1B, the SIT will not be conductive, because, when a dark current is flowing, if the discharge of the capacitor $C_{SL}$ occurs with only the impression of the address gate pulses $\phi_{Gj}$, a dark current signal will appear on the output waveform and the S/N of the ordinary light signal will deteriorate.

When the capacitor $C_{SL}$ is discharged by the impression of the address gate pulses $\phi_{Gj}$ as described above and is then recharged with the discharge amount, a recharge signal will appear at each end of the external resistance $R_L$.

When the transistor $Q_S$ is made conductive by the impression of the reading address pulses $\phi_{Si}$ onto the gate of the switching transistor $Q_S$, the capacitor $C_{SL}$ will be charged with a voltage value represented by $V_{DD}-V_{ths}$ where $V_{ths}$ represents a threshold voltage of the switching transistor $Q_S$. In this case, $V_{DD}-V_{ths}$ is usually selected to be $$V_{DD}-V_{ths}=V_{DD}'-V_{thp} \qquad (4).$$

In FIG. 1B, the waveform shown by $V_{SLi}$ shows how the capacitor $C_{SL}$ is recharged by the impression of the reading address pulses $\phi_{Si}$. Simultaneously with this recharging, at each end of the load resistance $R_L$, a signal represented by $V_{out}$ (enlarged waveform will be detected). The dotted line a corresponds to a dark current state, the one-point chain line b corresponds to the case of an ordinary light intensity and the solid line c corresponds to a saturated exposure state.

As evident from the above described explanation, in the conventional signal reading method, the parasitic capacitor $C_{SL}$ of the signal reading line $SL_i$ is utilized and the information of the inner picture element $C_{ij}$ is taken out at the load resistance $R_L$ after the process of charging-up the capacitor $C_{SL}$ by the precharging transistor $Q_P$, the discharge proportional to the light information of the capacitor $C_{SL}$ by the address gate pulses $\phi_{Gj}$ and the recharge of the capacitor $C_{SL}$ through the switching transistor (transistor for selecting the signal reading line $SL_i$) $Q_S$. It is a feature in the sense of obtaining a stable and uniform signal that the gate pulses $\phi_{Gj}$ will be addressed when the line $SL_i$ is charged with a predetermined potential always in reading out through the switching transistor $Q_P$ and a constant voltage is set to be applied between the drain 30 and source 32 of the SIT. The discharge amount of the capacitor $C_{SL}$ can be very easily read out through the switching transistor $Q_S$. In the case of the above described operation made with reference to FIGS. 1A and 1B, when the load resistance is represented by $R_L$, the on-resistance of the switching transistor $Q_S$ is represented by $R_{ONS}$ and the parasitic capacitance of the signal reading line $SL_i$ is represented by $C_{SL}$, the time constant of the output waveform $V_{out}$ at the output terminal 10 will be determined by $(R_L+R_{ONS})\cdot C_{SL}$.

Now, the formation example and operating waveform example of a conventional two-dimensional solid-state image pickup device based on the operation principle explained with reference to FIGS. 1A and 1B shall be explained with reference to FIGS. 2A and 2B.

Each of the picture elements $C_{ij}$ ($C_{11}$, $C_{12}$, ..., $C_{1m}$; $C_{21}$, ... $C_{2mj}$ ...) arranged in the form of a matrix of m×n is formed of an SIT and gate capacitor $C_G$, the gates of the respective SIT's are connected to address gate lines $GL_1$, $GL_2$, $GL_3$, ... $GL_m$ respectively through the gate capacitors $C_G$ and the drains of the respective SIT's are connected respectively to signal reading lines $SL_1$, $SL_2$, $SL_3$, ..., $SL_n$. The sources of the respective SIT's are of earthed potentials common to all the picture elements. Further, a precharging transistor $Q_P$ and two switching transistors $Q_T$ and $Q_S$ are connected on respective signal reading lines $SL_i$, the gate line 54 of the precharging transistors $Q_P$ is made to be connected in common at the gates of the precharging transistors $Q_P$ on the respective signal reading lines $SL_i$ and the gate line 53 of the switching transistors $Q_T$ is also made to be connected in common at the gates of the respective switching transistor $Q_T$ on the respective signal reading lines $SL_i$. Signal reading line selecting pulse trains $\phi_{S1}$, $\phi_{S2}$, $\phi_{S3}$, ... $\phi_{Sm}$ from a horizontal shift register 50 are so formed to be impressed onto the gates of the respective switching transistors $Q_S$, the drain terminals of the respective switching transistors $Q_S$ are connected in common to a video output line 51 and one load resistance $R_L$ and video current source $V_{DD}$ are connected on this video output line 51. A signal output is obtained from each end of the load resistance $R_L$. Address gate pulses $\phi_{G1}$, $\phi_{G2}$, $\phi_{G3}$, ..., $\phi_{Gn}$ are made to be impressed onto the respective address gate lines $GL_1$, $GL_2$, $GL_3$, ..., $GL_m$ from a vertical shift register 52. More particularly, the drain terminals of the respective precharging transistors $Q_P$ are connected in common to a current source line 55 to which a precharging voltage $V_{DD}$, is given.

In FIG. 2A, the parasitic capacitors of the respective signal reading lines $SL_1$, $SL_2$, $SL_3$, ..., $SL_n$ are expressed as $C_{SL}$, the capacitor between the gate and drain of the switching transistor $Q_T$ is expressed as $C_T$ and the capacitor which the drain of the switching transistor $Q_T$ and the source terminal of the switching transistor $Q_S$ have for the earthed potential is expressed as $C_{SL}'$. In order to effectively take out the light information of each picture element onto the video line 51, the sizes of the respective capacitors are made as follows:

$$C_G < C_{SL}' \approx C_T \lesssim C_{SL} \qquad (5)$$

Further, the values of the respective current source voltages are so selected that, if the threshold value voltage of each precharging transistor $Q_P$ is represented by $V_{thp}$, the threshold voltages of switching transistors $Q_T$ and $Q_s$ are represented respectively by $V_{tht}$ and $V_{ths}$, the height of the precharging pulse $\phi_P$ is represented by $V_{DD}'$, the height of the transfer gate pulse $\phi_T$ is represented by $V_{DD}'$ and the heights of the respective horizontal shift pulses $\phi_{S1}$, $\phi_{S2}$, ... $\phi_{SM}$ are assumed to equal to $V_{DD}$, then $$V_{DD}'-V_{thp}-V_{tht}=V_{DD}-V_{ths} \qquad (6).$$

Reversely speaking, reading under stable and uniform conditions is made by selecting the height $V_{DD}'$ of the transfer gate pulse $\phi_T$, the height of the precharging pulse $\phi_P$, the threshold value voltages $V_{thp}$ and $V_{tht}$, the height of the transfer gate pulse $\phi_T$, the threshold value voltage $V_{ths}$ and the height of the horizontal shift pulses $\phi_{Si}$ (i = 1~n) so that the voltage level on which signal reading line $SL_i$ is precharged and the capacitor $C_{SL}'$ is charged may be equal to the voltage level on which the capacitor $C_{SL}'$ is recharged by the conduction of the switching transistor $Q_S$. The source of the SIT's forming the respective picture elements is made common to all the picture elements by an n+ substrate or n+ embedded layer and further the SIT's forming the respective picture elements have the drains and gates separated from each other in the same semiconductor substrate so that the picture element signals may be separated from each other. Only the drains of the SIT's connected to the same signal reading line $SL_i$ are made electrically common.

FIG. 2B shows examples of reading operation waveforms of the conventional two-dimensional solid-state image pickup device shown in FIG. 2A. The operation waveforms shown in FIG. 2B show reading operation waveforms in the case that the light informations of the picture elements arranged in the form of a matrix of m×n are read out in turn as ($C_{11}$, $C_{21}$, $C_{22}$, ..., $C_{n1}$), ($C_{12}$, $C_{22}$, $C_{32}$, ..., $C_{n2}$), ... ($C_{1j}$, $C_{2j}$, $C_{3j}$, ..., $C_{nj}$), ($C_{1j+1}$, $C_{2j+1}$, $C_{3j+1}$, ..., $C_{nj+1}$), ... ($C_{1m}$, $C_{2m}$, ... $C_{nm}$). There is an improved type wherein the reading signal lines are scanned by skipping each line by applying an operating principle utilizing charging and discharging the parasitic capacitors $C_{SL}$ of the same signal reading line but the essential part is shown in FIG. 2B. Further, there is also a method of improving the operating waveforms in FIG. 2B. For example, there is a method wherein a function of adding onto the same gate address line $GL_j$ such pulses higher than the pulse height of the address gate pulses $\phi_{Gj}$ as, for example, refreshed pulses of more than 2.5 V and a pulse width within several $\mu$ sec. in a horizontal retracing period existing for only several $\mu$sec. after one horizontal reading period is added to the respective address gate pulses $\phi_{Gi}$. In the signal reading system shown in FIGS. 2A and 2B, as the address gate pulses $\phi_{Gi}$ are added, the light informations of the respective picture elements will move to the capacitors $C_{SL}$ and $C_{SL}'$ within a short time within the pulse width (less than several $\mu$sec.), the address gate pulses $\phi_{Gi}$ (of a height of 2 V and pulse width within several $\mu$sec.) will be added at the time of the address gate and refreshed pulses (of more than 2.5 V and within several $\mu$sec.) higher than the address gate pulses $\phi_{Gi}$ on the same line will be added in the horizontal retracing period substantially after the lapse of one horizontal period or just after the pulses of the transfer gate pulses $\phi_T$ are cut and the capacitors $C_{SL}$ and $C_{SL}'$ are separated from each other. However, most simply, if address gate pulses of a pulse height of more than 2.5 V and pulse width within several $\mu$sec. are used for the address gate pulses $\phi_{Gj}$ as shown in FIG. 2B, at the time of addressing the address gate pulses $\phi_{Gj}$, substantially all the carriers accumulated in the gate will be refreshed and therefore it will be no longer necessary to add the refreshed gate pulses in the horizontal retracing period or just after the pulses of the transfer gate pulses $\phi_T$ are cut. The higher the pulse height of the gate, the larger the spike noise accompanying the switching. Therefore, in case the switching spike noise is a problem, the function of controlling the height of the address gate pulses $\phi_{Gj}$ to be within 2 V and adding refreshed pulses in one horizontal retracing period or just after the pulses of the transfer gate pulses $\phi_T$ are cut will become effective. Therefore, here the simplest operating waveform is shown in FIG. 2B.

The operation of the above mentioned device shall be explained on the basis of FIG. 2B. The difference of the formation in FIG. 2A from the formation in FIGS. 1A and 1B is that the switching transistors $Q_T$ are added on the signal reading lines $SL_i$ (i = 1 ~n). This is for the following reasons. The m SIT's are connected to the same signal reading lines $SL_i$. In the light detecting state, the light will be irradiated to the respective SIT's, carriers will be accumulated in the gates, therefore the height of the potential barrier existing within the channel between the source and drain of each SIT will reduce and therefore the impedance between the signal reading line $SL_i$ and the ground will gradually reduce with the integrated amount of the light. When the impedance between the signal reading line $SL_i$ and the ground reduces, the potential with which the capacitor ($C_{SL}+C_{SL}'$) has been charged will be discharged. This discharged amount will correspond to the sum of light informations for one train. Of what picture element the light information will be unable to be specified. On the other hand, the light informations will be accumulated in the gate of each SIT and therefore will not be lost even if the potential of the signal reading line $SL_i$ fluctuates. The time after the horizontal shift pulses $\phi_{Si}$ are added until the horizontal shift pulses $\phi_{Sn}$ are added is substantially equal to one horizontal retracing period and is about 60 $\mu$sec. in the TV signal. Therefore, with the formation shown in FIGS. 1A and 1B as it is, in the period after the signal reading line $SL_i$ (i = 1 ~n) is precharged by the precharging signal, the same signal line $GL_j$ is addressed and the first picture element $C_{1j}$ is read out by the horizontal shift pulses $\phi_{S1}$ until the picture element $C_{nj}$ is read out by the horizontal shift pulses $\phi_{Sn}$, the precharged voltage level will be easier to discharge in the later signal reading lines. Particularly, the precharged potential of the signal reading line $SL_n$ must be kept constant for about 60 $\mu$sec. until the picture element $C_{nj}$ is read out by the horizontal shift pulses $\phi_{Sn}$. Meanwhile, the influence of the light received by the other picture elements connected to the same signal reading line $SL_i$ must by controlled as much as possible. However, as evident from experiments, the more the picture elements arranged on one horizontal line $SL_i$, the lower the impedance between the horizontal line $SL_i$ and the ground with the integrated amount of the light. Thus, even one horizontal retracing period of about 60 $\mu$sec. can not be neglected. Therefore, there has been worked in the conventional example a system wherein the switching transistor $Q_T$ shown in FIG. 2A is inserted, the parasitic capacitor ($C_{SL}+C_L'$) is charged in precharging the signal reading line, then the address gate pulses $\phi_{Gj}$ are immediately impressed, the light informations of the respective picture elements $C_{1j}$, $C_{2j}$, $C_{3j}$, ... $C_{nj}$ are accumulated as discharged amounts of the parasitic capacitors ($C_{SL}+C_{SL}'$) of the respective signal reading lines $SL_1$, $SL_2$, $SL_3$, .. $SL_n$, then the switching transistor $Q_T$ is immediately switched off and the informations of the respective picture elements are accumulated only in the capacitor $C_{SL}'$ and are taken out in the output line irrespectively of the discharged amount of the capacitor $C_{SL}$ by the horizontal shift pulses $\phi_{S1}$, $\phi_{S2}$, ..., $\phi_{Sn}$ FIG. 2B shows the operation waveforms of the conventional system over two horizontal periods.

At the time $t_1$, the transfer gate pulses $\phi_T$ are impressed and the switching transistors $Q_T$ on the respective signal reading lines are simultaneously made conductive and, at the time $t_2$, the precharging pulses $\phi_P$ are impressed, the precharging transistors on the respective signal reading lines are simultaneously made conductive and the capacitors ($C_{SL}+C_{SL}'$) of the respective signal reading lines are charged to the predetermined precharged voltage level. Then, at the time $t_3$, the respective SIT's of the picture elements $C_{1j}$, $C_{2j}$, $C_{3j}$ ... $C_{nj}$ are simultaneously made conductive by the address gate pulses $\phi_{Gj}$, the light informations accumulated in the gates of the respective SIT's are moved onto the respective signal reading lines $SL_1$, $SL_2$, ... $SL_n$ as discharged amounts of the parasitic capacitors ($S_{SL}+C_{SL}'$) and then immediately, at the time $t_4$, the switching transistor $Q_T$ is switched off and the capacitors $C_{SL}$ and $C_{SL}'$ are separated from each other. Then, at the times $t_5$, $t_6$, $t_7$, ..., the horizontal shift pulses $\phi_{S1}$, $\phi_{S2}$, $\phi_{S3}$, ..., $\phi_{Sn}$ are added in turn to the gates of the switching transistors $Q_S$ on the respective signal reading lines and the respective capacitors $C_{SL}'$ are recharged with the discharged amounts from the video voltage $V_{DD}$ so that the output voltage $V_{out}$ can be obtained at each end of the load resistance $R_L$. In the same manner, in the next horizontal period, the next picture elements $C_{1j+1}$, $C_{2j+1}$, $C_{3j+1}$, ... $C_{nj+1}$ are read out.

The actually used numerical time values shall be described. In the case of TV signals, the number of picture elements must be about $500 \times 500$ and therefore one horizontal reading period will be about 65 μsec. In this case, the reading time constant of one picture element will be easily realized to be several 10 n sec. in the area sensor of the SIT and the pulse width of the transfer gate pulse $\phi_T$ which is about the sum of the pulse width of the precharging pulse $\phi_P$ and the pulse width of the address gate pulse $\phi_{Gj}$ will be sufficient with less than 5 μsec. Therefore, if the reading system by the system shown in FIGS. 2A and 2B is used, the picture image informations of about $500 \times 500$ elements will be easily read out by using TV signals. In the case of this conventional system, the time constant in the case that they are read out by the pulses of the horizontal shift pulses $\phi_S$ will be the time constant of charging the capacitor $C_{SL}'$ as described above, the capacitor ($C_{SL} + C_{SL}'$) will not be charged, therefore the speed will be easily made higher and the time constant of about several 10 n sec. will be easily realized. In order to make the velocity higher, the parasitic capacitance and effective resistance of the video output line 51 are reduced.

However, in the formation of the two-dimensional solid-state image pickup device shown in FIGS. 2A and 2B, the source zones of the SIT's forming the respective picture elements $C_{ij}$ are electrically common over all the picture elements, the drain zones of the respective picture elements $C_{i1}$, $C_{i2}$, ..., $C_{im}$ arranged on the same signal reading line $SL_i$ are commonly connected to the signal reading line $SL_i$ and therefore normally off SIT's must be used for the SIT's forming the respective picture elements $C_{ij}$. Further, for the normally off SIT's, devices in which the leakage current between the drain and source in the dark current state is so little as to be less than $10^{-13}$(A) at the time of zero gate bias with a cell size of dimensions, for example, of $50\mu \times 50\mu$ must be uniformly arranged. The photosensitivity of such normally off SIT is close to the photosensitivity of a bipolar transistor, is of an optical gain of about $10^2$ to $10^3$ and is not so high. In the formation in FIGS. 2A and 2B, m picture elements are arranged on one signal reading line $SL_i$ and ideally the current corresponding to the light intensity may flow through only the picture element selected by the gate pulses $\phi_{Gj}$ but, in fact even in the (m−1) picture elements not selected, the leakage current will flow between the drain and source when not selected. In order to control this current, the SIT must be normally off. Now, in the case of the worst condition that such strong light as of a saturated exposure amount enters all the picture elements not selected, when the leak current between the drain and source flowing through the respective picture elements gate-biased by the light is represented by I', this current will flow through the capacitor ($C_{SL} + C_{SL}'$) for the time $t_{pt}$ after the precharged pulses $\phi_P$ are cut until the transfer gate pulses $\phi_T$ are cut, and the total amount Q' of the electric charge flowing out of the capacitor ($C_{SL} + C_{SL}'$) will be approximately $$Q' = (m-1)I't_{pt} \quad (7)$$

The potential variation V' at both ends of the capacitor ($C_{SL} + C_{SL}'$) by this electric charge will be $$V' = \frac{Q}{C_{SL} + C_{SL}'} = \frac{(m-1)I't_{pt}}{C_{SL} + C_{SL}'} . \quad (8)$$

As the maximum value of the potential variation at both ends of the capacitor ($C_{SL} + C_{SL}'$) is substantially the video voltage level $V_{DD}$, the ratio of the potential variation V' to the video voltage level $V_{DD}$ will be $$\frac{V'}{V_{DD}} = \frac{(m-1)I't_{pt}}{(C_{SL} + C_{SL}')V_{DD}} . \quad (9)$$

If $V_{DD} = 1$ V, $C_{SL} + C_{SL}' = 1$pF and $t_{pt} = 1$ μsec. as the most practical numerical values, the value of I' required to control $V'/V_{DD}$ to be less than 0.1% will be required to be so small that, when m = 500, $I' < 2 \times 10^{-12}$(A) and
when m = 1000, $I' < 1 \times 10^{-12}$(A).

The reason why such small leaking current is required is that the drains and sources of the SIT's forming the picture elements $C_{i1}$, $C_{i2}$, $C_{im}$ on the same signal reading line are made respectively electrically common. In the case of the conventional example, the condition for controlling the amount of discharge throught the unselected picture elements during the time $t_{pt}$ after the precharging pulses $\phi_P$ are cut until the transfer gate pulses $\phi_T$ are cut is considerably severe as described above.

Therefore, it has been found that, if the source regions of the respective SIT's forming the picture elements $C_{i1}$, $C_{i2}$, $C_{i3}$, ..., $C_{im}$ on the same signal reading lines are connected to the respectively separate source lines $BL_1$, $BL_2$, $BL_3$, ..., $BL_m$ which are made to have a constant capacitor $C_{BL}$ in the unselected state to control the discharge through the SIT's and the selected source line is earthed only when selected to discharge the precharged level of the capacitor ($C_{SL} + C_{SL}'$) through the SIT, the crosstalk between both picture elements will be solved.

Generally, the photosensitivity of an SIT image sensor of a gate accumulating system having as a fundamental formation of one picture element the formation consisting of an SIT and gate capacitor $C_G$ corresponds just to the photosensitivity of the SIT when the gate is opened. When the gate is opened, the optical gain of the SIT will greatly depend on the gate structure of the SIT. If the height of a potential barrier within an n⁻ *channel as seen from a source* n+ region is represented by $V_{biG*S}$ and the diffused potential between a p+ gate and n+ source region is represented by $V_{biGS}$, the maximum value of the direct current optical gain $G_{max}$ will be approximately represented by $$G_{max} = \frac{n_s V_n}{P_G V_p} \exp \frac{q}{kT} (V_{biGS} - V_{biS*G}) \quad (10)$$

where $n_S$, $P_G$, $V_n$, $V_P$, q, k and T represent respectively an electron density of the source region, positive hole density of the gate region, average velocity of electrons at the intrinsic gate point, diffusing velocity of the positive holes of the gate into the source region, unit electric charge, Boltzmann's constant and absolute temperature. There is a feature that the weaker the light intensity, the larger the optical gain. The formula (10) is of a value of the light intensity at the minimum. The term of exp q/kT ($V_{biGS} - V_{biG*S}$) in the formula (10) relates to the difference between the height of the potential barrier of the positive holes accumulated in the gate and the height of the potential barrier of electrons at the source and is about $10^7$ to $10^8$. In the case of a device having such high $V_{biG*S}$ as $V_{biGs} \approx V_{biG*S}$ among the normally off SIT's, the optical gain will be about $10^2$ to $10^3$. For the normally off SIT forming the picture element of the two-dimensional solid-state image pickup shown in FIGS. 2A and 2B, the leakage current in the dark current state between the drain and source must be made less than $10^{-13}$ a device of a cell size, for example, of $50\mu \times 50\mu$. Thus, the devcie in which the leakage current between the drain and source is little must be designed so that the height $V_{biG*S}$ of the potential barrier within the channel may be necessarily high and does not well utilize the intrinsic high photosensitivity of the SIT. The great reason for this is the signal crosstalk between the picture elements when arranged in the form of a matrix as described above. In the conventional example in FIGS. 2A and 2B, the drain and source regions of the SIT's forming the respective picture elements on the same signal reading lines $SL_i$ ($i=1 \sim n$) are respectively electrically common. The photosensitivity of the SIT forming the picture element in the case of the conventional example in FIGS. 2A and 2B is about $10^2$ to $10^3$ but, as the same n+ substrate or n+ buried layer can be utilized, the formation of the two-dimensional arrangement is simple and the reading method is also simple.

In the conventional example explained with reference to FIGS. 2A and 2B, in the SIT's forming the picture elements, all the picture elements are electrically common and, in the SIT's arranged on the same signal reading lines, the source regions and drain regions are common. Therefore, when the light enters the picture element in which the gate is not selected and the impedance between the source and drain of the SIT reduces, the current flowing as a discharged current from the capacitor ($C_{SL} + C_{SL}'$) will be likely to be detected as a false signal. In order to control such false signal to be below 0.1% of such saturated output as, for example, $V_{DD}=1$ V, the current flowing through the picture element when the gate is biased with the light when not selected must be less than $2 \times 10^{-12}(A)$ in the matrix of $500 \times 500$ picture elements and must be considerably characteristic of being normally off. Further, as explained with the formula (10), as the value of the height $V_{biG*S}$ of the potential barrier within the channel becomes closer to the potential difference $V_{biGS}$ between the gate and source, the photosensitivity of such SIT will not become so high. In the case of the conventional example, in case there is a faulty picture element (short-circuited) in the matrix, even the other picture elements connected to the same signal reading line will be considered to be short-circuited and the influence on the adjacent picture elements will be large.

SUMMARY OF THE INVENTION

A primary object of the present invention is to provide a solid-state image pickup device having a high detecting sensitivity even to a feeble light.

Another object of the present invention is to provide a solid-state image pickup device able to operate at a high velocity in spite of a low power consumption and having a large capacity (a large number of picture elements).

A further object of the present invention is to provide a solid-state image pickup device which can stably and uniformly detect picture images.

According to the present invention, these objects are attained by a formation wherein picture elements formed of SIT's (static induction transistors) each having a optical gain of $10^6$ to $10^8$ and able to detect such feeble light as of about $10^{-4}\mu W/cm^2$ are arranged in a matrix, a gate accumulating system able to detect a two-dimensional reading, the source regions of the respective SIT's are connected to common source lines, the respective source lines have source line selecting transistors connected between them and the ground and the gates of the respective source line selecting transistors are connected respectively to vertical gate address lines, whereby, simultaneously with the selection of the vertical gate address lines, the source lines will be connected to the ground.

According to the two-dimensional solid-state image pickup device of the present invention, for a normally off SIT, an element through which a current between a drain and source of about $10^{-9}(A)$ to $10^{-6}(A)$ can be made to flow with a cell size of $50\mu \times 50\mu$ at the time of zero gate bias can be used as a formation of one picture element and further the problem of a crosstalk between the picture elements can be solved. Further, the optical gain of the SIT showing such characteristics is so high as to be about $10^6$ to $10^8$. Further, if the two-dimensional formation by the present invention is used, even if a specific picture element is short-circuited, there will be no influence on the other adjacent picuture elements.

These and other objects of the present invention will become more apparent during the course of the following detailed description and appended claims.

DESCRIPTION OF THE PREFERRED EMBODIMENTS

Figure 1A:
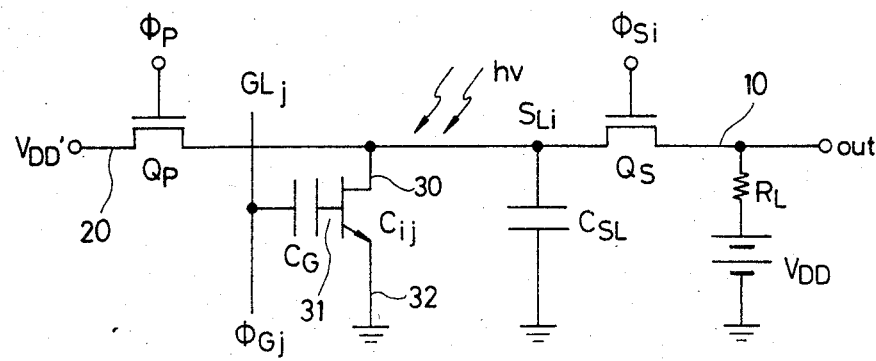
FIG. 1A is a view of a circuit formation of one picture element for explaining the principle of a conventional reading system.
Figure 1B:
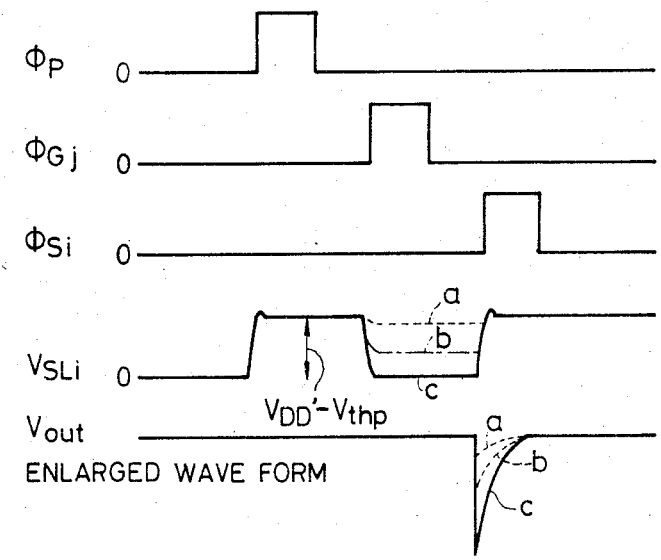
FIG. 1B is a view of the formation of a conventional two-dimensional solid-state image pickup device.

The present invention relates to the formation of a two-dimensional solid-state image pickup device well utilizing the intrinsic high photosensitivity of SIT's characterized in that the source regions of SIT's forming respective picture elements $C_{1j}$, $C_{2j}$, ..., $C_{nj}$ on vertical gate address lines $GL_j$ (j=1 to m) are connected to common source lines $BL_j$, the respective source lines $BL_j$ (j=1 to m) have source line selecting transistors $Q_B$ connected between them and the ground, the gates of respective transistors $Q_S$ are connected to respective vertical gate address lines $GL_j$ so that, simultaneously with the selection of the vertical gate address lines $GL_j$, the source lines $BL_j$ may be connected to the ground.

Respective signal reading lines $SL_i$ (i=1 to n) have capacitors $(C_{SL}+C_{SL}')$ between them and the ground and the capacitors $(C_{SL}+C_{SL}')$ of the respective signal reading lines $SL_i$ (i=1 to n) are precharged simultaneously with making precharging transistors $Q_P$ conductive by precharging pulses $\phi_P$ from a current source $V_{DD}'$. The respective picture element trains $C_{1j}$, $C_{2j}$, ..., $C_{nj}$ on the vertical gate address lines $GL_j$ are simultaneously selected by vertical address pulses $\phi_{Gj}$ from a vertical shift register and the potential levels with which the respective capacitors $(C_{SL}+C_{SL}')$ have been charged are discharged to the ground through the source lines $BL_j$ and source line selecting transistors $Q_B$ through the respective SIT's in response to the light informations accumulated in the gates of the SIT's which are the respective picture elements. The same as in the conventional example, the discharged amounts of the respective capacitors $(C_{SL}+C_{SL}')$ are detected as discharged amounts of only the capacitors $C_{SL}'$ by cutting transfer pulses $\phi_T$ to switch off a transfer register $Q_T$. The discharged amounts, that is, the light informations of the respective capacitors $C_{SL}'$ are detected as the signal variations of a load $R_L$ on a common video line through switching transistors $Q_S$ selected in turn by reading line selecting pulses $\phi_{S1}$, $\phi_{S2}$, ..., $\phi_{Sn}$ from a horizontal shift register. Or the light informations from the capacitors $C_{SL}'$ may be simultaneously put into a shift register CCD or the like and may be taken out as a CCD output the same as in the conventional example.

If the two-dimensional solid-state image pickup device of such formation as is described above is used, SIT's having an optical gain of $10^6$ to $10^8$ and able to detect such feeble light as of about $10^{-4}$ $\mu W/cm^2$ will be able to be used for the formation of respective picture elements and the crosstalk between the respective picture elements will be able to be positively controlled. The difference from the conventional example in the arrangement of the two-dimensional matrix is that, as described above, the source region of the SIT's which are respective picture elements arranged on the vertical gate address lines $GL_j$ (j=1 to m) are connected to the common $BL_j$ (j=1 to m) and the source region of the SIT's which are respective picture elements arranged on the same signal reading lines $SL_i$ (i=1 to n) are connected to separate source lines $BL_1$, $BL_2$, ... $BL_m$.

The characteristic of the normally off SIT's forming the respective picture elements of the two-dimensional solid-state image pickup device according to the present invention is that the SIT's in which the value of the leakage current between the drain and source in a dark current state is about $10^{-9}$ to $10^{-6}(A)$ with a cell size, for example, of $50\mu \times 50\mu$ can be arranged while positively controlling the crosstalk. It has become experimentally evident that the photosensitivity of such SIT is of a value of $10^6$ to $10^8$. It is found from the formula (10) that, in case the value of the height $V_{biG*S}$ of the potential barrier within the channel is lower by about 0.3 to 0.5 eV than the value of $V_{biGS}$, the value of exp q/kT $(V_{biGS}-V_{biG*S})$ will be about $10^6$ to $10^8$.

Figure 3A:
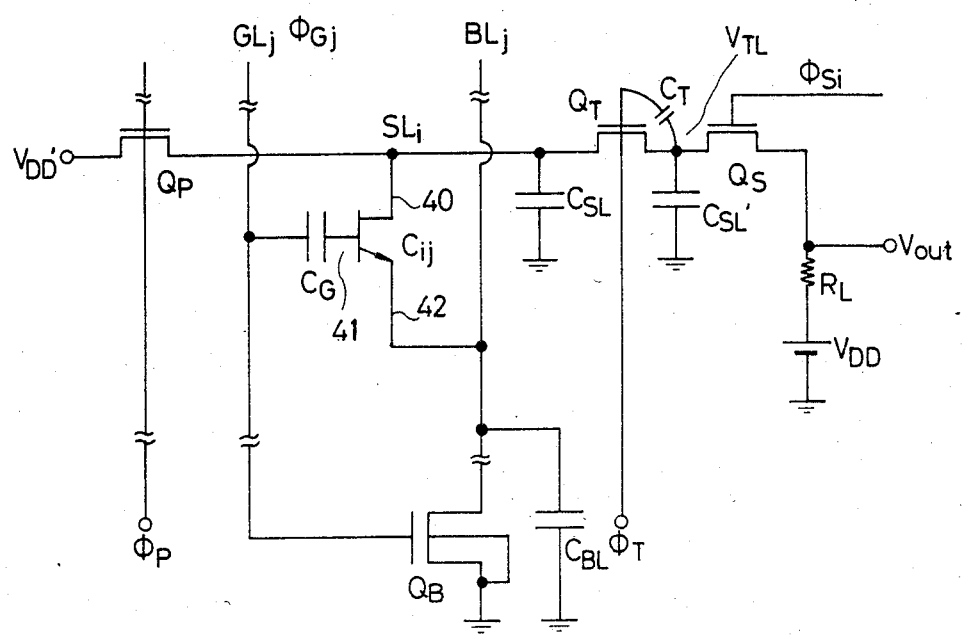
FIG. 3A is a view for explaining the principle of one picture element part of a two-dimensional solid-state image pickup device according to the present invention.
Figure 3B:
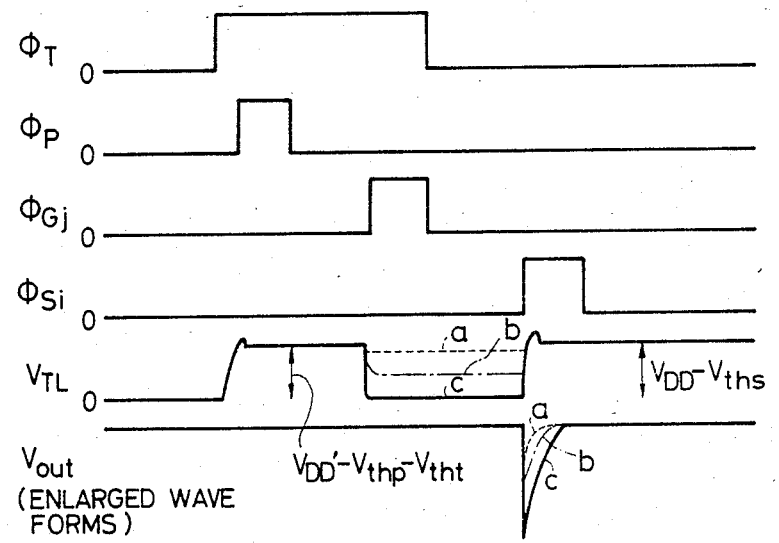
FIG. 3B is a view of the operation waveforms of the same.

FIG. 3A is a principle explaining view of one picture element part of the two-dimensional solid-state image pickup device according to the present invention. FIG. 3B shows its reading operation waveforms. In FIG. 3A, one picture element $C_{ij}$ is formed of a normally off SIT and gate capacitor $C_G$, the drain 40 of the SIT is connected to the signal reading line $SL_i$, the gate 41 is connected to the vertical gate address line $GL_i$ through a gate capacitor $C_G$ and the source 42 is connected to the source line $BL_j$. A precharging transistor $Q_P$ and transfer transistor $Q_T$ are connected to the signal reading line $SL_i$. The drain of the transfer transistor $Q_T$ is connected to a video voltage $V_{DD}$ through a switching transistor $Q_S$ and load resistance $R_L$.

The difference from the conventional example in FIG. 1A is that the source 42 of the SIT is not connected to the ground but is connected to the ground through a source line selecting transistor $Q_B$. The source line selecting transistor $Q_B$ is selected simultaneously with the selection of the SIT with the selecting pulses $\phi_{Gj}$ of the vertical signal address line $GL_j$. In FIG. 3A, the capacitor held by the signal reading line $SL_i$ between it and the ground is represented by $C_{SL}$, the capacitor between the gate and drain of the transfer transistor $Q_T$ is represented by $C_T$ and the capacitor held by the drain part of the transfer transistor $Q_T$ and source part of the switching transistor $Q_S$ between them and the ground is represented by $C_{SL}'$. Further, the capacitor held by the source line $BL_j$ between it and the ground is represented by $C_{BL}$.

The operation of the device shown in FIG. 3A shall be explained in the following with reference to FIG. 3B. Assuming the case that the light is being continuously radiated, the operation waveforms at the time of a reading operation in the case of reading out at a constant light integrating time $T_{L1}$ are shown in FIG. 3B. In the case of reading out the light information of the picture element $C_{ij}$, first the transfer transistor $Q_T$ is made conductive by the transfer pulses $\phi_T$ to the gate of the transfer transistor $Q_T$ and the capacitor $C_{SL}'$ is connected to the capacitor $C_{SL}$ of the signal reading line $SL_i$. The pulse width of the transfer pulse $\phi_T$ is within several $\mu$ sec. While the transfer pulses $\phi_T$ are impressed, precharging pulses $\phi_P$ are impressed on the switching transistor $Q_P$, the capacitor $(C_{SL}+C_{SL}')$ is charged to the level of $V_{DD}'-V_{thp}$ from the precharging voltage source $V_{DD}'$ then address gate pulses $\phi_{Gj}$ on the gate of the source line selecting transistor $Q_B$, the transistor $Q_B$ is made conductive, the source line BL is connected to the ground and, at the same time, a discharge current corresponding to the light information by holes accumulated in the gate flows between the drain and source of the picture element $C_{ij}$. The manner of the potential variation of the capacitor $C_{SL}'$ is shown by the waveform of $V_{TL}$. The dotted line a corresponds to a dark current state, the one-point chain line b corresponds to an ordinary light radiating state and the solid line c corresponds to a state that a saturated exposure amount of light is radiated. Then, even if the transfer pulses $\phi_T$ are cut and the transfer transistor $Q_T$ is switched off, the discharging state of the capacitor $C_{SL}'$ will not vary. When the capacitor $C_{SL}'$ is recharged with the discharged amount through the switching transistor $Q_S$, a light signal of the picture element $C_{ij}$ corresponding to the discharged amount of the capacitor $C_{SL}'$ will be detected from both ends of the load resistance $R_L$. The relations of the precharging voltage source $V_{DD}'$, video voltage source $V_{DD}$, threshold value voltage $V_{thp}$ of the precharging transistor $Q_P$ and threshold value voltage $V_{ths}$ of the switching transistor $Q_S$ are selected usually to be as in the formula (6). Also, in order to effectively take out the light information of the picture element $C_{ij}$ into the video output line, the sizes of the capacitors of the respective parts are made to be as in $$C_G < C_{SL}' \approx C_T \approx C_{SL} \approx C_{BL} \tag{11}$$

Figure 2A:
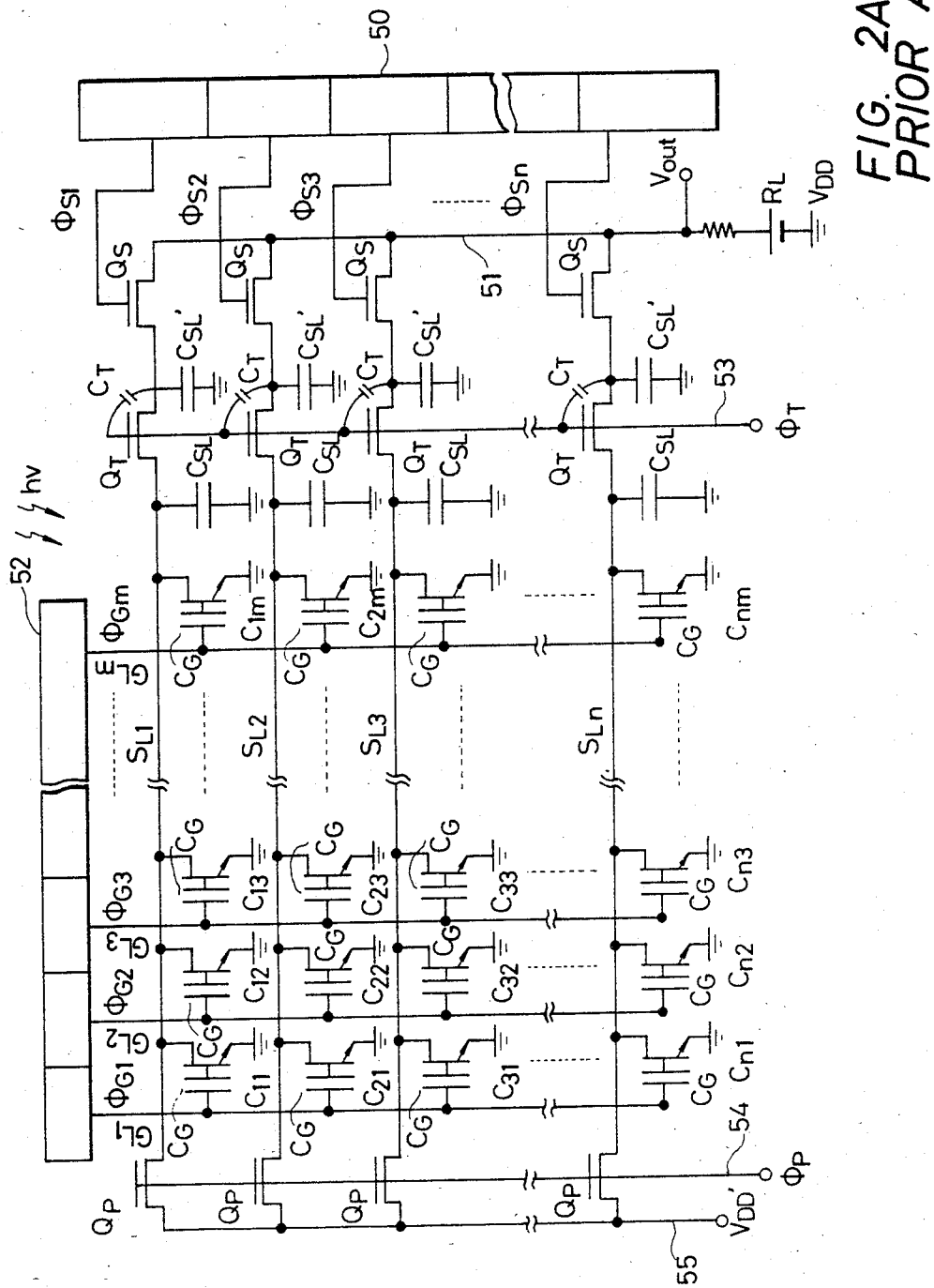
FIG. 2A is a view of the formation of a conventional two-dimensional solid-state image pickup device.
Figure 2B:
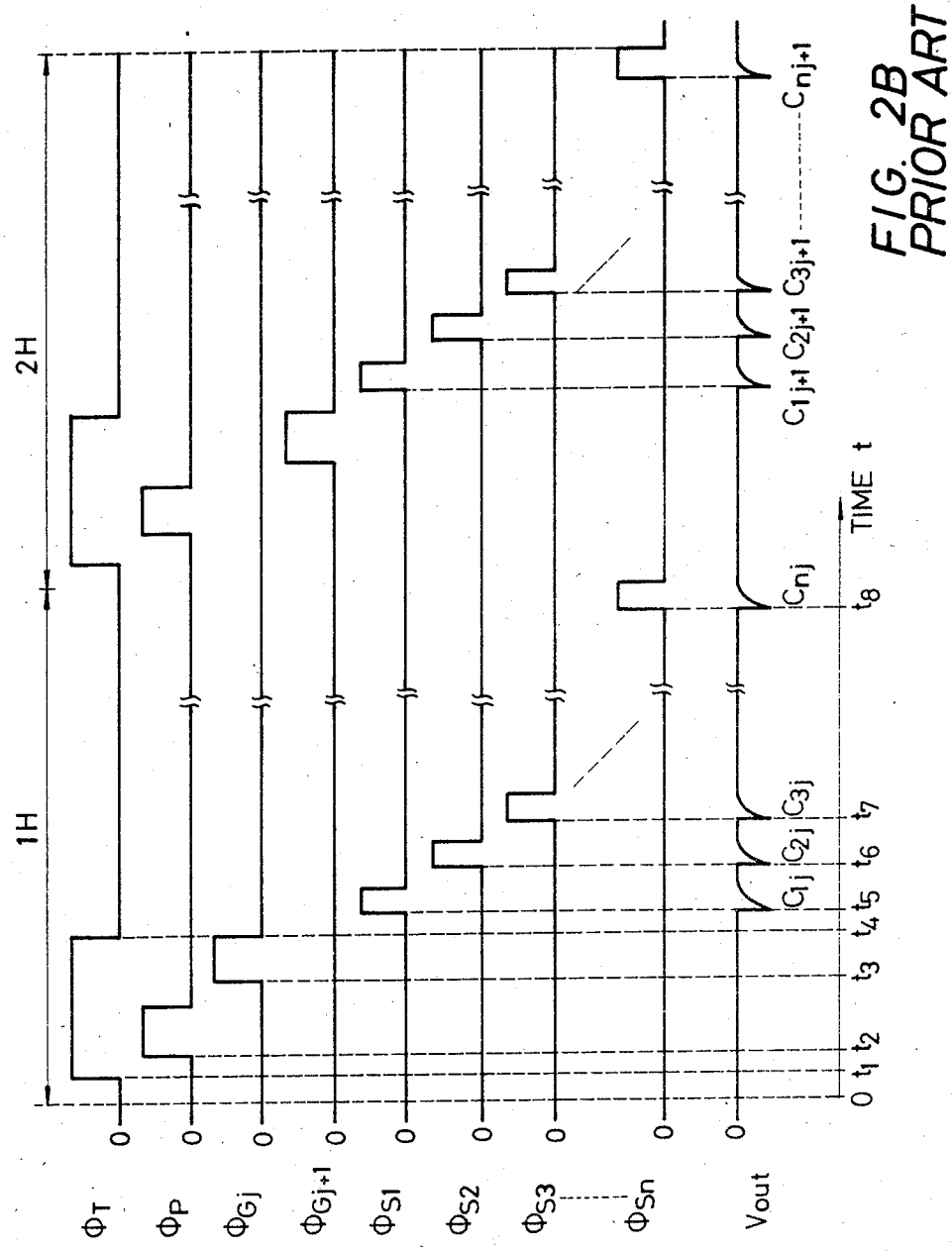
FIG. 2B is a view of the signal reading operation waveforms (for 2H) of the conventional device.
Figure 4A:
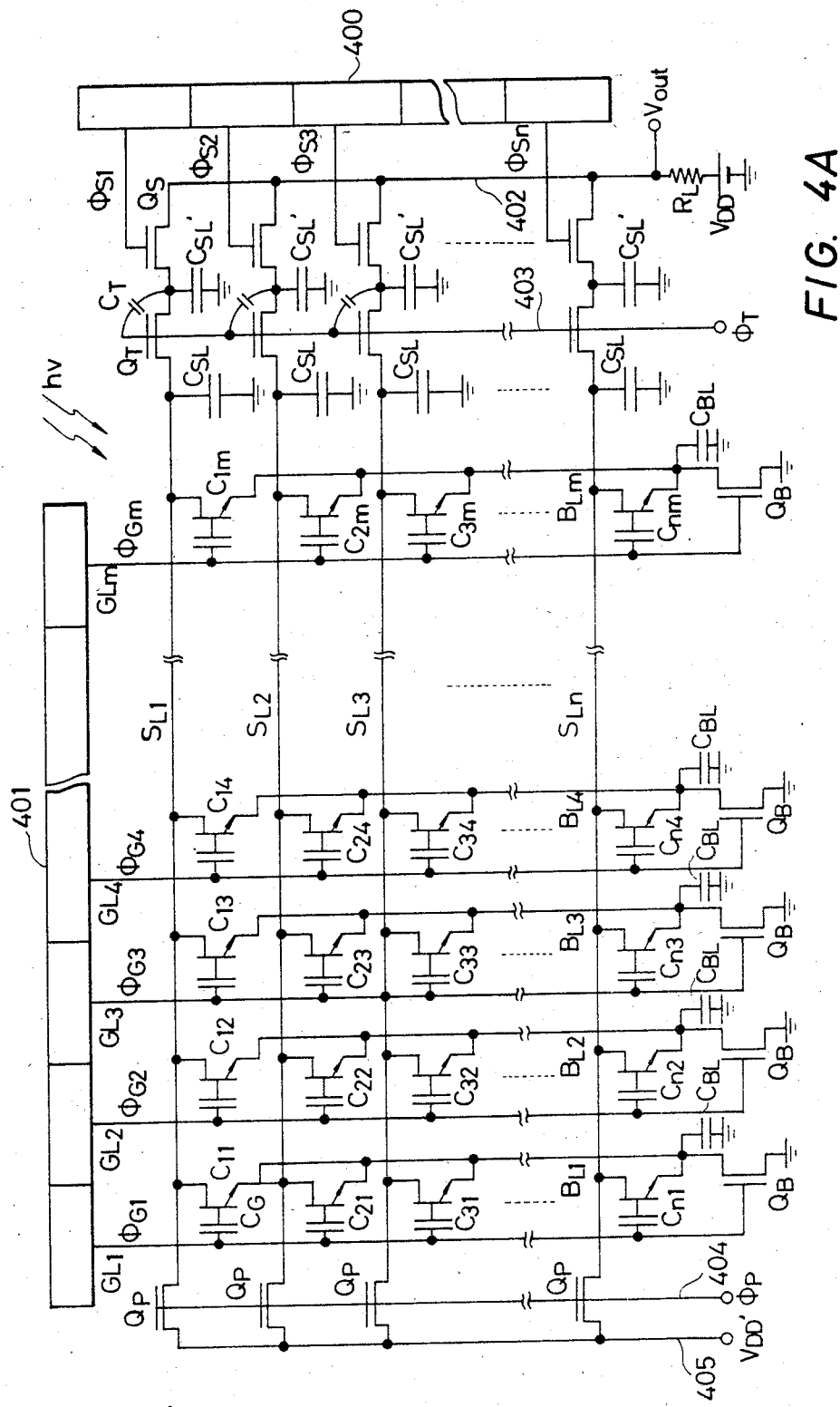
FIG. 4A is a view of an embodiment of the formation of the two-dimensional solid-state image pickup device according to the present invention.
Figure 4B:
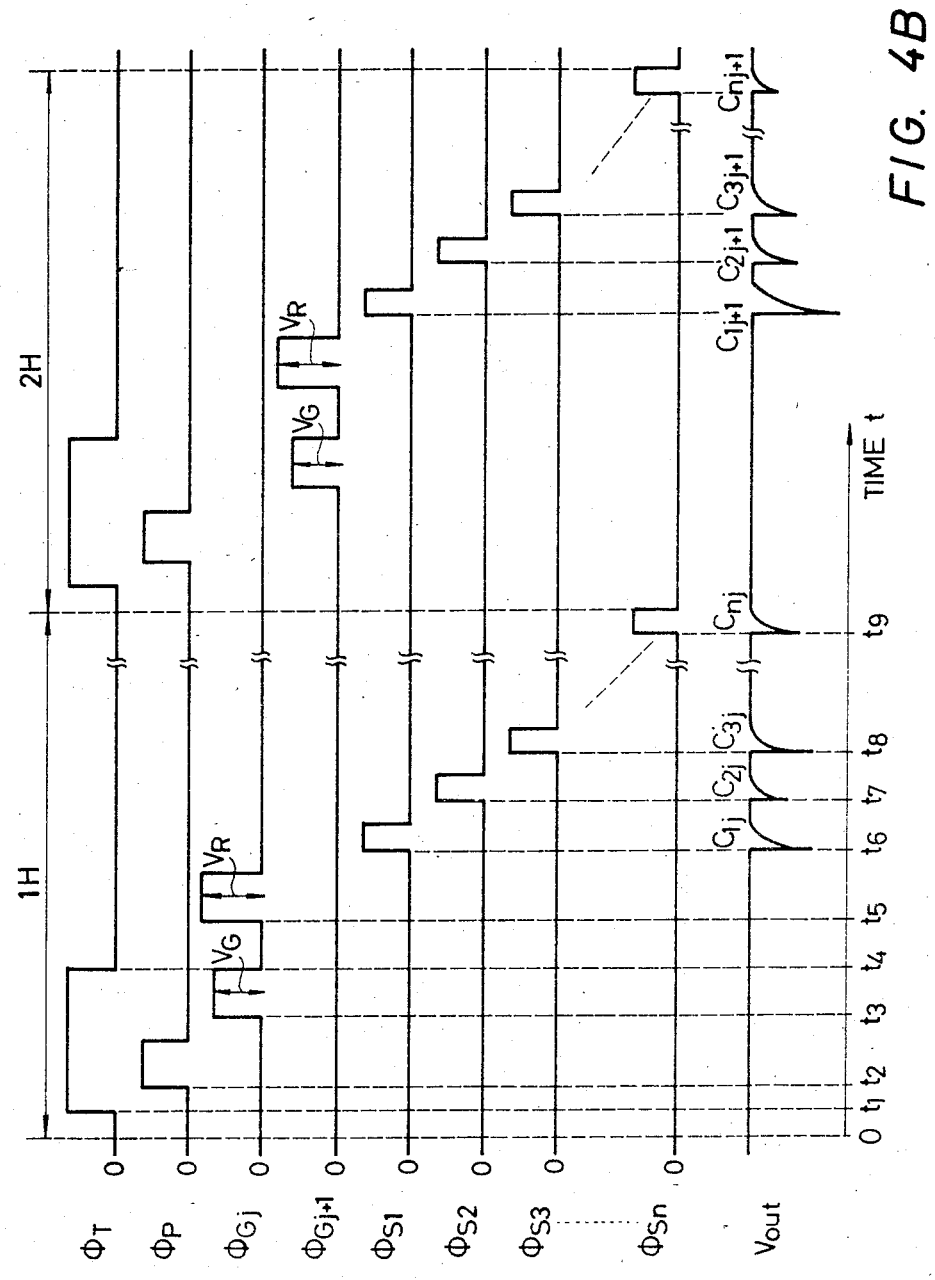
FIG. 4B is a view of the reading operation waveforms of the same.

FIG. 4A shows an embodiment of the two-dimensional solid-state image pickup device according to the present invention. FIG. 4B shows its reading operation waveforms. The difference from the conventional example in FIG. 2A is that the source regions of the picture elements $C_{1j}, C_{2j}, C_{3j}, \ldots, C_{nj}$ ($C_{11}, C_{21}, \ldots C_{n1}$; $C_{12}, C_{22}, \ldots, C_{2n}; \ldots C_{1m}, C_{2m}, \ldots C_{nm}$) connected respectively to the vertical address gate lines $GL_j$ ($GL_1$, $GL_2, GL_3, \ldots, GL_m$) are connected to common source lines $BL_j$ and separate source line selecting transistors $Q_B$ are connected between them and the ground to the respective source lines $BL_j$. The drain regions of the SIT's forming the picture elements $C_{i1}, C_{i2}, C_{i3}, \ldots,$ $C_{im}$ ($C_{11}, C_{12}, \ldots, C_{1m}; C_{21}, C_{22}, \ldots, C_{2m}; \ldots C_{n1}, C_{n2},$ $\ldots C_{nm}$) on the same signal reading lines $SL_i$ ($SL_1$, $SL_2$, $\ldots SL_n$) are connected to the signal reading lines $SL_i$ ($SL_1, SL_2, \ldots, SL_n$) but the source regions are connected to separate source lines $BL_1, BL_2, BL_3, \ldots,$ $BL_m$. The source line selecting transistors $Q_B$ are connected between them and the ground to the respective source lines $BL_j$ (j=1 to m) so that, when the vertical gate address lines $GL_j$ (j=1 to m) are not selected, the source line selecting transistors $Q_B$ will be switched off. The respective source lines $BL_j$ (j=1 to m) have capacitors $C_{BL}$ so that, only when the address lines $GL_j$ (j=1 to m) select the picture elements, the source line selecting transistors will be conductive, the source lines $BL_j$ will be connected to the ground, the SIT's forming the picture elements $C_{1j}, C_{2j}, C_{3j}, \ldots, C_{nj}$ selected by the address lines $GL_j$ will be also conductive in response to the light informations accumulated in the gates of the respective picture elements and the capacitors $C_{SL}$ on the separate signal reading lines will be respectively discharged. In FIG. 4A, 400 and 401 represent respectively a horizontal shift register and vertical shift register, 402 represents a video output line, 403 represents a common line of the gates of the transfer transistors $Q_T$ for simultaneously impressing transfer pulses $\phi_T$, 404 represents a common line of the gates of the precharging transistors $Q_P$ for simultaneously impressing precharging pulses $\phi_P$ and 405 represents a precharging voltage source line. In FIG. 4B, the operation waveforms in FIG. 4A are shown on two horizontal periods and the timing periods, pulse heights, pulse widths and positions of the respective pulses are all the same as in the conventional example shown in FIG. 2B. In the address pulse waveforms $\phi_{Gj}$ and $\phi_{Gj+1}$, $V_g$ represents the height of the address pulse and $V_R$ represents the height of the refreshed pulse. Thus, it is the same as in the conventional example that the refreshed pulses may be added.

Figure 5:
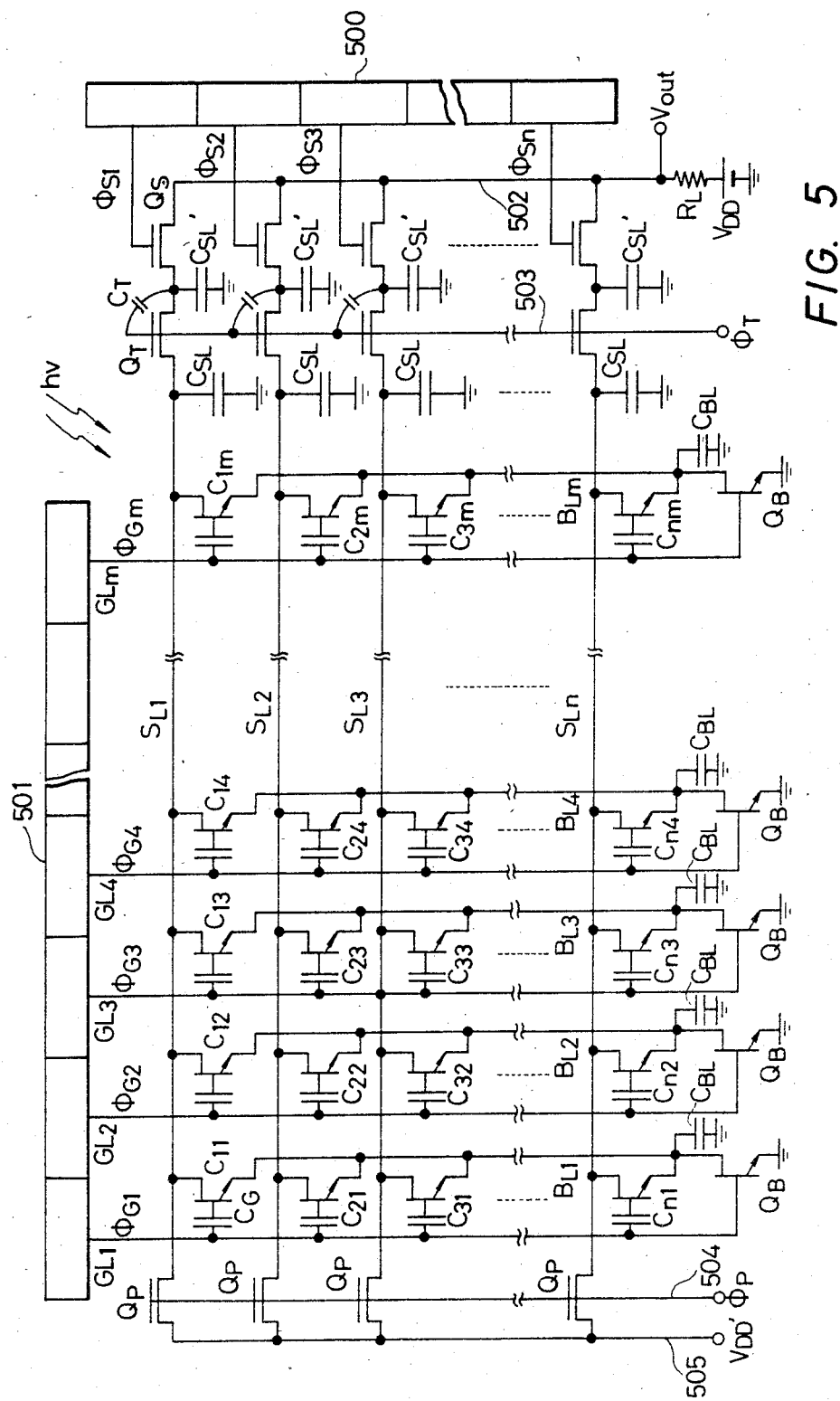
FIG. 5 is a view of another embodiment of the formation of the two-dimensional solid-state image pickup device of the present invention.

FIG. 5 is of another embodiment of the two-dimensional solid-state image pickup device according to the present invention. Therein, 500 and 501 represent respectively a horizontal shift register and vertical shift register and 502, 503, 504 and 505 represent respectively a video output line, transfer pulse $\phi_T$ impressing line, precharging pulse $\phi_p$ impressing gate line and precharging voltage source line. The difference from the embodiment shown in FIG. 4A is that the transistors connected between the respective source lines $BL_1$, $BL_2$, $BL_3, \ldots, BL_m$ and the ground are static induction transistors (SIT's). Usually the respective source lines $BL_1, BL_2, BL_3, \ldots, BL_m$ are made of $n^+$ embedded layers (See FIG. 7A). Therefore, in the case of making them by integration, if SIT's are used for the source line selecting transistors $Q_B$, the integration will be easy. That is to say, as the gates of the transistors $Q_B$ are connected to the source lines $GL_j$ (j=1 to m), the picture element trains $C_{1j}, C_{2j}, C_{3j}, \ldots, C_{nj}$ ($C_{11}, C_{12}, \ldots$ $, C_{1m}; C_{21}, C_{22}, \ldots, C_{2m}; \ldots ; C_{n1}, C_{n2}, \ldots, C_{nm}$) formed of SIT's having gate capacitors $C_G$ and SIT's as the transistors $Q_B$ are adapted to be manufactured by integration. The other formations and operating methods in the embodiment in FIG. 5 are all the same as in the embodiment in FIGS. 4A and 4B.

Figure 6:
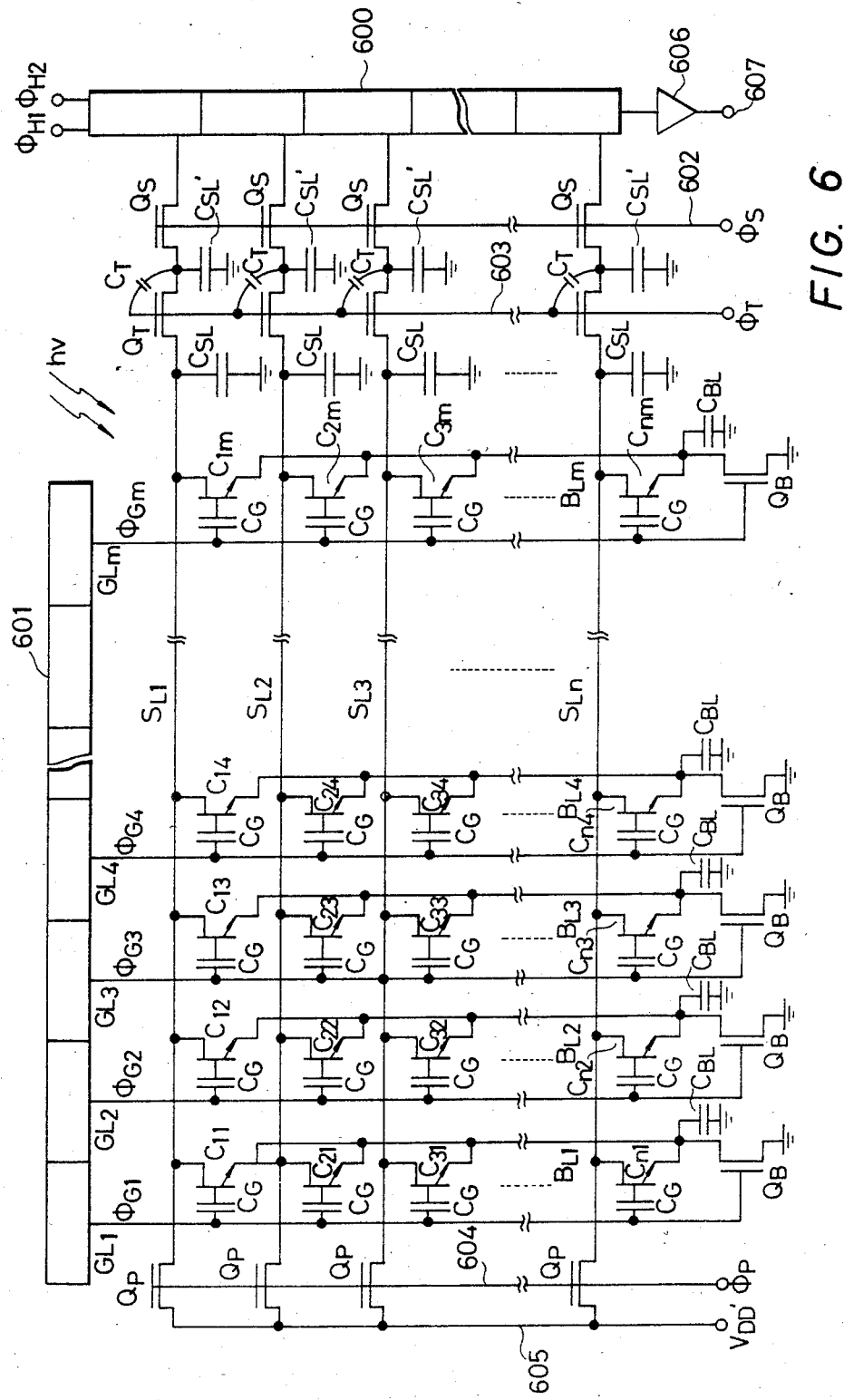
FIG. 6 is a view of another embodiment of the formation of the two-dimensional solid-state image pickup device according to the present invention.

FIG. 6 shows further another embodiment of the secondary solid-state image pickup device according to the present invention. In this embodiment, as a method of detecting the discharged amount of the capacitor $C_{SL}'$, gate pulses $\phi_S$ are impressed simultaneously onto the gate line 602 of the switching transistors $Q_S$ and, at the same time, the light informations accumulated as the discharged amounts of the respective capacitors $C_{SL}'$ are put into the accumulating region of a horizontal signal transferring CCD and are taken out as a CCD output. The CCD 600 operates with 2-phase clock pulses $\phi_{H1}$ and $\phi_{H2}$. 606 represents a buffer amplifier and 607 represents an output terminal. 601 represents a vertical shift register, 603 represents a transfer pulse $\phi_T$ impressing line, 604 represents a precharging pulse $\phi_P$ impressing line and 605 represents a precharging current source line. MOS transistors are connected as switching transistors $Q_B$ between the respective source lines $BL_1, BL_2, BL_3, \ldots, BL_m$ and the ground. The switching transistors $Q_B$ may be SIT's. As a reading operation, after the transfer pulses $\phi_T$ are cut, gate pulse $\phi_S$ may be simultaneously impressed onto the gates of all the switching transistors $Q_S$, the light informations accumulated as discharged amounts in the respective capacitors $C_{SL}$ may be transferred to the accumulating regions by potential wells within the CCD 600 and then n signal outputs may be taken out to the output terminal within one horizontal period.

Figure 7A:
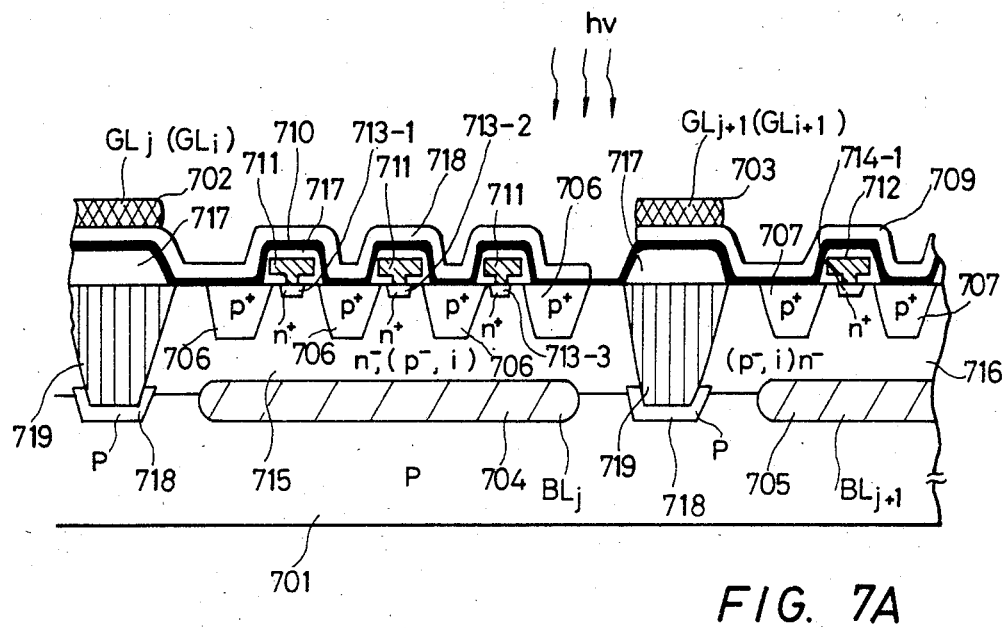
FIG. 7A is a sectioned view of the structure of one picture element part of the two-dimensional solid-state image pickup device according to the present invention.
Figure 7B:
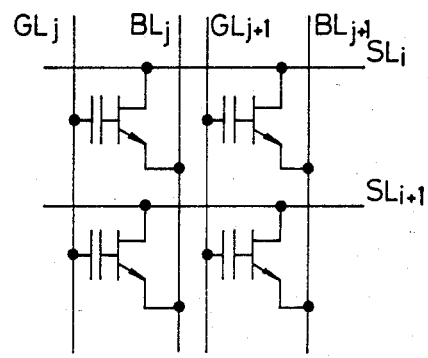
FIG. 7B is a view of circuits by a $2 \times 2$ matrix.
Figure 7C:
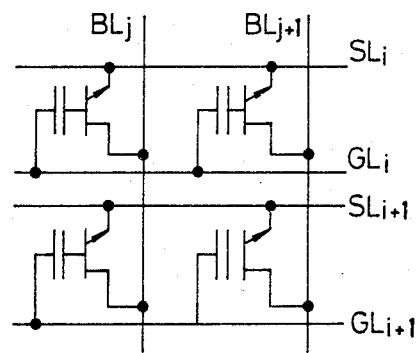
FIG. 7C is an another view of circuits by a $2 \times 2$ matrix.

FIG. 7A shows a sectioned structure of one picture element part of the two-dimensional solid-state image pickup device according to the present invention. FIGS. 7B and 7C are circuit diagrams for explaining that there are two matrix forming methods by both upright and inverted operations of the SIT by exemplifying a matrix of 2×2.

FIG. 7A shows static induction transistors (SIT's) and gate capacitors made as integrated within a semiconductor substrate. Therein, 701 represents a p-type substrate, the n+ buried layers 704 and 705 correspond to the common source lines $BL_j$ and $BL_{j+1}$ of the adjacent picture element trains ($C_{1j}$, $C_{2j}$, ..., $C_{nj}$) and ($C_{1j+1}$, $C_{2j+1}$, ..., $C_{nj+1}$), the region 719 is an isolation region separating from each other the channel regions 715 and 716 formed of n−, p− or i layers. The p region 718 is a diffusing region for insulating from each other the p+ gate regions 706 and 707 of the adjacent picture elements. The surface n+ regions 713-1, 713-2 and 713-3 represent drain regions of the SIT forming one picture element. The drain regions 713-1, 713-2 and 713-3 are electrically connected through an n+ polysilicon electrode 711 or the like in the part not shown on the paper surface. That is to say, in the embodiment shown in FIG. 7A, the SIT forming one picture element has three channel regions. Such multichannels are to gain the current. In case it is required to make the cell size of one picture element small, a single channel will do. In such case, the current will be ⅓. The thin insulating film 710 formed of an $Si_3N_4$ film, $SiO_2$ film or the like is formed on all the surface above the p+ gate region 706 enclosing the n+ drain regions 713-1, 713-2 and 713-3. 708 represents a transparent electrode. 702 represents an Al contact line with the transparent electrode 708. The n+ region 714-1 is an n+ drain region of the SIT of the adjacent picture element. The n−, p− or i layer 716 is a channel region of the SIT of the adjacent picture element. 709 represents the same transparent electrode as the transparent electrode 708. 703 represents an Al contact line with the transparent electrode 709. The Al contact lines 702 and 703 are respectively address gate lines $GL_j$ and $GL_{j+1}$ to the adjacent picture element trains ($C_{1j}$, $C_{2j}$, $C_{3j}$, ..., $C_{nj}$) and ($C_{1j+1}$, $C_{2j+1}$, $C_{3j+1}$, ..., $C_{nj+1}$). The n polysilicon electrodes 711 and 712 are connected to the same signal reading line $SL_i$. The signal reading line $SL_i$ is wired with an Al electrode or the like (not illustrated) so as to intersect rectangurarly with the address gate lines $GL_j$ and $GL_{j+1}$ above the isolation region 719. The region 717 is an insulating layer. The light hv is radiated from the device surface. The gate capacitor $C_G$ is formed of an MIS capacitor consisting of the transparent electrode 708, thin insulator layer 710 and p+ gate region 706. The source line 704 is formed in parallel with the address gate line 702 and therefore it is easy to form an SIT as the switching transistor $Q_B$ in a part not shown in the drawing.

FIG. 7B shows a matrix formation in the case of forming the surface n+ regions 713-1, 713-2 and 713-3 as drain regions and the n+ buried layer 704 as a source region in the same manner as in the matrix formation in the embodiments shown in FIGS. 4A to 6. FIG. 7C shows a matrix formation in the case of forming the surface n+ regions 713-1, 713-2 and 713-3 as source regions and the n+ buried layer 704 as a drain layer. In this case, the buried layer lines $BL_j$ and $BL_{j+1}$ will be signal reading lines, the lines $SL_i$ and $SL_{i+1}$ connected in common with the source region will be source lines and the address lines $GL_j$ and $GL_{j+1}$ will intersect rectangularly with the signal reading lines $BL_j$ and $BL_{j+1}$. The source line selecting transistors $Q_B$ connected between the respective source lines $SL_i$, $SL_{i+1}$ and others and the ground are connected between the source line $SL_i$ to which the surface n+ source regions 713, 714 and others are connected and the ground as different from the case of the above described FIGS. 7A and 7B and therefore need not particularly be SIT's. FIG. 7B is of a matrix formation in the case that an inverted SIT is made a component of one picture element, the same as in the embodiments in FIGS. 4A to 6. On the other hand, FIG. 7C corresponds to the case that an upright SIT is made a component of one picture element.

Figure 8:
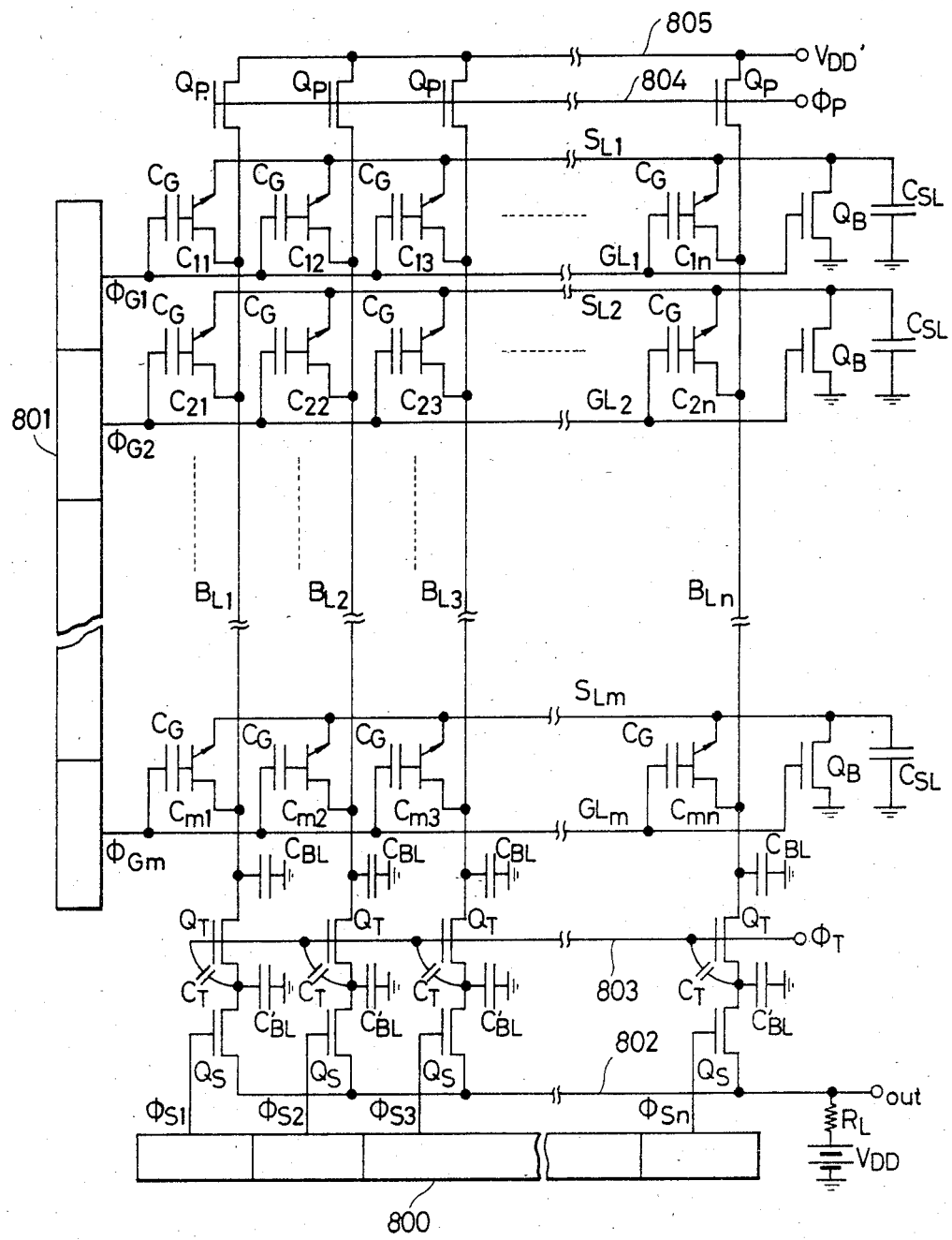
FIG. 8 is a view of another embodiment of the formation of the two-dimensional solid-state image pickup device according to the present invention, particularly showing a formation made by developing the circuits in FIG. 7C.

An embodiment applying the forming method in FIG. 7C to the two-dimensional solid-state image pickup device is shown in FIG. 8. The picture elements $C_{ij}$ in FIG. 8 are formed of upright SIT's and gate capacitors $C_G$ and are arranged in the form of a matrix of m×n. 800 represents a horizontal shift register, 801 represents a vertical shift register, 802 represents a video output line, 803 represents an address line to the transfer transistor $Q_T$, 804 represents an address line to the precharging transistor $Q_P$ and 805 represents a precharging current source line. The source region of the SIT forming the picture element $C_{ij}$ is connected to the source line $SL_i$, the drain region is connected to the reading signal line $BL_j$ and the gate region is connected to the address line $GL_i$ through the gate capacitor $C_G$. Further, the switching transistor $Q_B$ is connected to the source line between it and the ground and the address line $GL_i$ is connected to the gate of the transistor $Q_B$ so that, simultaneously with the selection of the address line $G_{Li}$, by the address pulses $\phi_{Gi}$, any of the picture element trains ($C_{i1}$, $C_{i2}$, $C_{i3}$, ..., $C_{in}$) will be selected, the switching transistor $Q_B$ will be conductive and the source line $SL_i$ will be connected to the ground. On the signal reading line $BL_j$, the precharging transistor $Q_P$ is connected with the precharging current source $V_{DD}'$. Further, the transfer transistor $Q_T$ and switching transistor $Q_S$ are connected in series to the signal reading line $BL_j$ between them and the video output line 802. The respective signal reading lines $BL_j$ (j=1 to n) have capacitors $C_{BL}$ between them and the ground. Further, the capacitor $C'_{BL}$ is connected between the drain of the transfer transistor $Q_T$ and source zone of the switching transistor $Q_S$ and the ground. The capacitance between the gate and drain of the transfer transistor $Q_T$ is expressed by $C_T$. In case the switching transistor $Q_B$ is off, the respective source lines $SL_i$ (i=1 to m) will have the capacitors $C_{SL}$. Address pulses $\phi_{Gi}$ (i=1 to m) will be impressed in turn onto the respective address lines $GL_i$ (i=1 to m) from the vertical shift register 801, horizontal shift pulses $\phi_{Sj}$ (j=1 to n) will be impressed in turn onto the gates of the switching transistors $Q_S$ on the respective signal reading lines $BL_j$ (j=1 to n) from the horizontal shift register 800 and the output signal will be detected from both ends of the load resistance $R_L$ between the video line 802 and video current source $V_{DD}$. As an upright operating SIT can be used for the SIT forming the picture element of the two-dimensional solid-state image pickup device in FIG. 8, the photosensitivity will be higher than in the embodiments in FIGS. 4A to 6. This is because, as evident from the sectioned structure in FIG. 7A, as the surface n+ regions 713-1, 713-2, 713-3, 714-1, ... are used for the source regions and the embedded n+ regions 704 and 705 are used for the drain regions, in the device operation, the rate of arrival at the drain of electrons injected from the source will be able to be made higher than in the case of the reverse operation (inverted operation). The value of the rate of variation ($G_m$) to the current between the source and drain of the gate potential variation can be taken to be high. The reading operation of the two-dimensional solid-state image pickup device in FIG. 8 is fundamentally the same as in the embodiment shown in FIG. 4A. That is to say, transfer pulses $\phi_T$ having a width of several $\mu$ sec. are added, precharging pulses $\phi_P$ are impressed onto the precharging transistor $Q_P$ within the pulse period and the capacitors ($C_{BL}+C'_{BL}$) on all the signal reading lines are precharged up to the level of $V_{DD}'-V_{thp}$. After the precharging pulses $\phi_P$ are cut, address pulses $\phi_{Gi}$ are immediately impressed onto the address line $GL_i$, the picture element trains $C_{i1}$, $C_{i2}$, $C_{i3}$, ..., $C_{in}$ on the address line $GL_i$ are selected, the source line selecting transistor $Q_B$ is made conductive and the capacitors ($C_{BL}+C'_{BL}$) are discharged in response to the accumulation of positive holes as light informations accumulated in the gates of the respective picture elements through the SIT's of the respective picture elements. Then, if the address pulses $\phi_{Gi}$ and transfer pulses $\phi_T$ are simultaneously cut, the light informations of the picture element trains $C_{i1}$, $C_{i2}$, ..., $C_{in}$ will appear only in the capacitors $C'_{BL}$. Therefore, over one horizontal period, if the horizontal shift pulses $\phi_{S1}$, $\phi_{S2}$, ..., $\phi_{Sn}$ are added in turn to the gates of the respective switching transistors $Q_S$ and the capacitors $C'_{BL}$ are recharged from the video voltage $V_{DD}$ with the discharged part, the output signals $V_{out}$ will be serially obtained. In the next horizontal period, when the transfer pulses $\phi_T$ are added, the precharging pulses $\phi_P$ are added and, in the same manner, the address pulses $\phi_{Gi+1}$ are added, the light informations of the adjacent picture element trains $C_{i+11}$, $C_{i+12}$, $C_{i+13}$, ..., $C_{i+1n}$ will be read out in the same manner. The respective pulse widths and pulse heights are the same as in the conventional example or the embodiment in FIG. 4B and the formula (6) holds. The sizes of the capacitances of the respective parts are related as represented by $$C_G < C'_{BL} \approx C_T \leq C_{BL} \approx C_{SL} \quad (12)$$

the same as in the formula (11).

Figure 9:
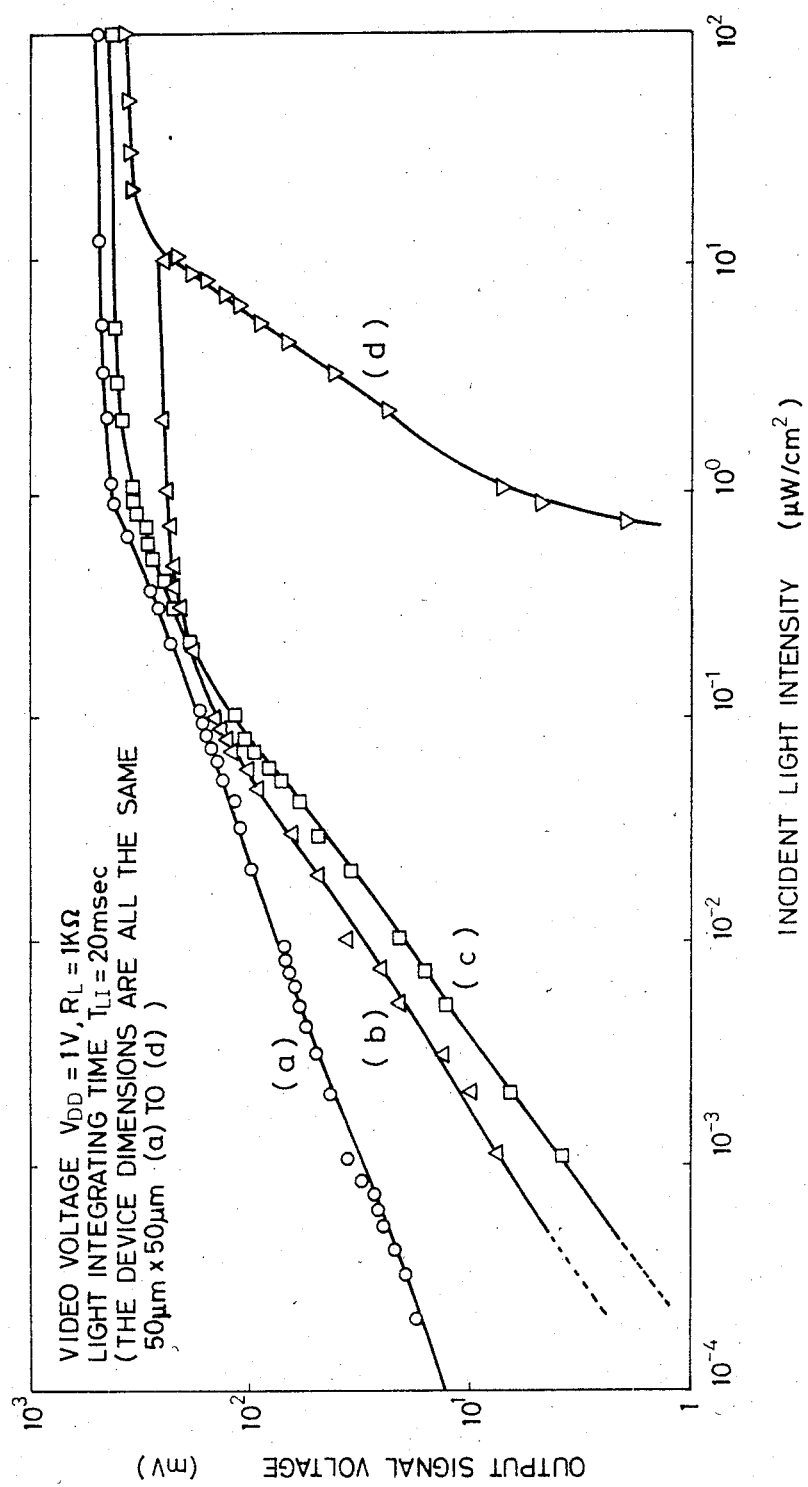
FIG. 9 is a diagram showing a comparison of the photoelectric conversion characteristics of the two-dimensional solid-state image pickup device according to the present invention and the two-dimensional solid-state image pickup device of the conventional example (in FIG. 2A), wherein the curves (a) to (c) represent experiment results relating to the present invention and the curves (d) represents experiment results in the conventional example.

FIG. 9 shows the comparison of the photoelectric conversion characteristics of one picture element part read out by using the formation of the two-dimensional solid-state image pickup device according to the present invention shown in FIG. 8 and the formation of the conventional two-dimensional solid-state image pickup device shown in FIG. 2. The dimensions of one picture element are $50\mu \times 50\mu$ in both. The video voltage $V_{DD}=1V$ and $R_L=1K\Omega$ and the light integrating time is 20 msec. A light of a wave length of 6550Å is irradiated. The abscissa represents the incident light intensity P ($\mu W/cm^2$) and the ordinate represents the value obtained by subtracting the peak value of the output signal obtained from both ends of the load $R_L$ from the dark current level. The saturation level of the output is lower than the video voltage of 1V because it is reduced by the threshold value of the switching MOS transistor. Here the explanation shall be made by using the curves (a) to (d). The curves (a) to (c) represent the experiment results of the formation by the present invention and the curve (d) represents the experiment results of the conventional example shown in FIG. 2. The characteristics of the curves (a) to (c) are different because the picture elements having SIT's different in the heights of the potential barriers $V_{biG*S}$ within the channel were measured. In the curves (a), (b) and (c), the potential barriers $V_{biG*S}$ become higher to approach $V_{biGS}$. Further, the SIT of the picture element of the curve (d) uses such small element that the leakage current between the drain and source is less than $10^{-13}$(A) in the dark current state. As described above, in the formation of the conventional example, only such photoelectric conversion characteristic as in the curve (d) has been obtained but, if the formation by the present invention is used, the sensitivity to feeble lights will be improved by about three orders. Particularly, such extremely feeble light as of $10^{-4}$ ($\mu W/cm^2$) can be detected, the sensitivity is very high and the dynamic range is wide. Also, the capacitor of the signal reading line in the X-Y address system is used and is charged always to a fixed precharging level at the time of reading out and then the light information is detected as a discharged amount. Thus, the operation is stable and the picture image is uniformly detected. As no system of detecting direct currents is used, the operation is perfectly dynamic and the power consumption is low. The reading velocity is as high as in the conventional example.

In the formation of the two-dimensional solid-state image pickup device according to the present invention, the high photosensitivity of the SIT can be well utilized, the light of an intensity, for example, of $10^{-4}$ $\mu W/cm^2$ is detected with a light integrating time of 20 m sec. and the characteristic of the SIT tube (silicon intensified target tube) said to be the highest in the sensitivity of conventional image pickup tubes is aoproached.

The two-dimensional solid-state image pickup device according to the present invention is characterized by the detection of very feeble lights and is high in the industrial value.

What is claimed is:

1. A two-dimensional solid-state image pickup device comprising a plurality of picture elements each comprising a normally off static induction transistor and a gate capacitor connected to the gate of said static induction transistor, a plurality of vertical address gate lines connected in common to the respective gate capacitors of said picture elements arranged along respective lines, a plurality of signal reading lines connected in common to the drains of the respective static induction transistors forming said picture elements arranged along the respective lines, a plurality of precharging transistors connected to each of said plurality of signal reading lines, a voltage source connected in common to said plurality of signal reading lines through said precharging transistors, a plurality of first capacitors connected between each of said plurality of signal reading lines and the ground, a video output line connected in common to each of said plurality of signal reading lines through a transfer transistor and first switching transistor connected in series and connected to the ground through a load resistance and video voltage source, a transfer pulse address gate line connected in common to the gates of said respective transfer transistors, a second capacitor connected between the gates and drains of said respective transfer transistors, a third capacitor connected between the drain of said respective transfer transistors and the ground, a plurality of source lines connected in common to the sources of the respective static induction transistors forming said picture elements connected respectively to said respective vertical address gate lines a plurality of second switching transistors connected respectively between said respective source lines and the ground and having the respective gates connected to said respective vertical address gate lines a plurality of fourth capacitors in case said respective second switching transistor is in the off-state connected respectively between said respective source lines and the ground and a plurality of second capacitors connected respectively between said respective source lines and the ground, in order to arrange said plurality of picture elements in the form of a matrix, said plurality of vertical gate address lines and said plurality of source lines being arranged in parallel with each other and said plurality of signal reading lines being arranged so as to intersect rectangularly with said plurality of vertical address gate lines and said plurality of signal reading lines and, in order to make an X-Y address, vertical shift pulses, which are generated from a vertical shift resistor being impressed onto said respective vertical address gate lines and horizontal shift pulses, which are generated from a horizontal shift register being impressed onto the gates of said respective first switching transistors and, when the capacitance of said gate capacitor is represented by $C_G$, the capacitance of said first capacitor is represented by $C_{SL}$, the capacitance of said second capacitor is represented by $C_T$, the capacitance of said third capacitor is represented by $C_{SL}'$ and the capacitance of said fourth capacitor is represented by $C_{BL}$, the relation of $C_G < C_{SL}' \approx C_T \approx C_{SL} \approx C_{BL}$ being satisfied.

2. A two-dimensional solid-state image pickup device according to claim 1 wherein said static induction transistor is of an upright type.

3. A two-dimensional solid-state image pickup device according to claim 1 wherein said static induction transistor is of an inverted type.

4. A two-dimensional solid-state image pickup device according to claim 1 wherein said second switching transistor is a static induction transistor.

5. A two-dimensional solid-state image pickup device according to claim 1 wherein said second switching transistor is an MOS transistor.

6. A two-dimensional solid-state image pickup device comprising a plurality of picture elements each comprising a normally off static induction transistor and a gate capacitor connected to the gate of said static induction transistor, a plurality of vertical address gate lines connected in common to the respective gate capacitors of said picture elements arranged along respective lines, a plurality of signal reading lines connected in common to the drains of the respective static induction transistors forming said picture elements arranged along the respective lines, a plurality of precharging transistors connected to each of said plurality of signal reading lines, a voltage source connected in common to said plurality of signal reading lines through said precharging transistors, a plurality of first capacitors connected between each of said plurality of signal reading lines and the ground, a horizontal signal transferring CCD having an accumulating zone connected to each of said plurality of signal reading lines through a transfer transistor and first switching transistor connected in series, a transfer pulse address gate line connected in common to the gates of said respective transfer transistors, a second capacitor connected between the gates and drains of said respective transfer transistors, a third capacitor connected between the drains of said respective transfer transistors and the ground, a plurality of source lines connected in common to the sources of the respective static induction transistors forming said picture elements connected respectively to said respective vertical address gate lines, a plurality of fourth capacitors connected respectively between said respective source lines and the ground, a plurality of second switching transistors connected respectively between said respective source lines and the ground and having the respective gates connected to said respective vertical address gate lines and a plurality of second capacitors connected respectively between said respective source lines and the ground, when the capacitance of said gate capacitor is represented by $C_G$, the capacitance of said first capacitor is represented by $C_{SL}$, the capacitance of said second capacitor is represented by $C_T$, the capacitance of said third capacitor is represented by $C_{SL}'$ and the capacitance of said fourth capacitor is represented by $C_{BL}$, the relation of $C_G < C_{SL}' \approx C_T \approx C_{SL} \approx C_{BL}$ being satisfied and, whenever vertical shift pulses are impressed onto said respective vertical address lines, picture image informations from the train of picture elements along the vertical address gate lines onto which the vertical shift pulses which are generated by a vertical shift register have been impressed being put in parallel into said CCD in turn by switching on and off said transfer transistor and first switching transistor to complete the transfer of the train of picture elements within one horizontal period and to thereby obtain picture image informations in turn from the output terminal of said CCD.

* * * * *